United States Patent
Hoffmann et al.

[15] 3,689,565
[45] Sept. 5, 1972

[54] α-METHYLOLBENZOIN ETHERS

[72] Inventors: Horst Hoffmann, 4 Neuwiesenstrasse, 6700 Ludwigshafen; Heinrich Hartmann, 46 Weinheimer Strasse, 6703 Limburgerhof; Carl Heinrich Krauch, 51 Am Schlierbachhang, 6900 Heidelberg; Otto Volkert, 2 Neuwiesenstrasse, 6700 Ludwigshafen, all of Germany

[22] Filed: May 4, 1970
[21] Appl. No.: 34,530

[52] U.S. Cl. ............... 260/590, 96/35.1, 96/115, 156/272, 204/159.23
[51] Int. Cl. ............................................. C07c 49/82

[58] Field of Search ............. 260/590; 204/159.23

[56] References Cited

UNITED STATES PATENTS 2,367,661   1/1945   Agre .................. 260/159.23
2,722,512   11/1955   Crandall ............. 260/159.23

Primary Examiner—Daniel D. Horwitz
Attorney—Johnston, Root, O'Keeffe, Keil, Thompson & Shurtleff

[57] ABSTRACT

α-methylolbenzoin ethers, their production and their use as photoinitiators.

3 Claims, No Drawings

α-METHYLOLBENZOIN ETHERS

Benzoin compounds having the general formula (I):

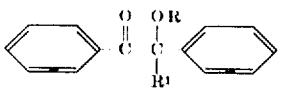

(I)

where R and R¹ both denote hydrogen atoms, or R denotes a hydrocarbon radical and R¹ denotes a hydrogen atom, or R denotes a hydrogen atom and R¹ denotes a hydrocarbon radical, and their use as photoinitiators are known for example from U.S. Pats. Nos. 2,367,661, 2,367,670, and 2,722,512.

We have now found that α-methylolbenzoin ethers having the formula (II):

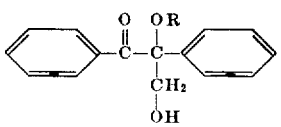

(II)

where R denotes an alkyl or alkoxyalkyl radical having one to eight carbon atoms and particularly one to four carbon atoms are particularly advantageous photoinitiators.

Production is generally carried out by dissolving benzoin in an excess of a compound bearing the radical R (alcohol) and etherifying the benzoin under conventional conditions in the solution.

A polar solvent which stabilizes carbanions, particularly dimethyl sulfoxide or dimethylformamide, is added and an about 10 percent molar excess of formaldehyde, preferably in the form of paraformaldehyde in a solvent of the same type, particularly dimethylsulfoxide or dimethylformamide, is added to a solution of alkali metal hydroxide in alcohol. The pH during the methylolation should be in the neutral or weakly alkaline range, preferably from 7 to 9. After the reaction is over, the methylolation product may be precipitated with water.

A particularly suprising advantage of the α-methylolbenzoin ethers lies in their good thermal stability combined with good photoinitiating action, in which they are superior to the prior art benzoin compounds specified above. The improved thermal resistance may be clearly seen when comparing the ratio of the velocity constants of the photochemical decay $k_{photochem.}$ to the velocity constants of the thermal decay $k_{therm.}$ of the individual benzoin compounds in a system containing photopolymerizable monomers, the following values being obtained at 50° C:

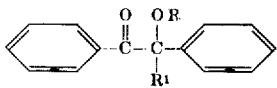

Formula (I)

| R | R¹ | $k_{photochem.}/k_{therm.}$ |
|---|---|---|
| H | H | 180 |
| CH₃ | H | 7500 |
| CH(CH₃)₂ | H | 7900 |
| H | CH₃ | 8300 |
| H | C₆H₅ | 4700 |
| CH₃ | CH₂OH | 13600 |

Improved thermal stability of photoinitiators is of very great importance for their use in practice. In the production of photopolymerizable coatings, plates, sheeting or film the substances being photopolymerized, for example in the process of dissolving or in laminating film or sheeting onto substrates or in the pressing of plates, are exposed to considerable thermal stress, often having to be kept at temperatures above 100° C for long periods. This is especially the case in the production of photopolymerizable elements from which relief printing plates are to be prepared later by exposure to light followed by washing out, especially when the elements have been prepared in a press. Even in the light-curing process itself however undesirable thermal stresses may occur, for example by the heat of polymerization or when using light sources characterized by poor energy conversion rates as regards the output of light. The photopolymerizing substances should therefore (in order not to harden in procedures involving thermal stresses and not to polymerize in dark areas in optical information fixation) contain photoinitiators which (a) have substantial thermal stability and (b) decompose photochemically with a good quantum yield into radicals which are able to initiate the desired polymerization or crosslinking. The α-methylolbenzoin ethers of the invention satisfy requirements in practice to a far greater extent than the benzoin compounds hitherto used.

The following are examples of α-methylolbenzoin ethers according to this invention:

the methyl, ethyl, butyl, hexyl, octyl, 2-ethylhexyl and cyclohexyl ethers and also 2-alkoxyethyl ethers such as the 2-methoxymethyl ether. At the moment it is preferred to use the methyl ether.

The following may be said concerning the use of the α-methylolbenzoin ethers according to the invention as photoinitiators:

The new photoinitiators may be added at any point in time in the production of known and conventional light-sensitive materials in amounts conventionally used for photoinitiators. They are usually used in amounts of from 0.01 to 5 percent, preferably in amounts of from 0.05 to 1 percent by weight with reference to the light-sensitive material or photopolymerizable compounds. Naturally the α-methylolbenzoins according to the invention may also be used in combination with other known and conventional photoinitiators.

The light-sensitive materials to which the α-methylolbenzoin ethers according to the invention may be added as photoinitiators are those conventionally used for example in the production of light-sensitive plates, sheeting or film, particularly mixtures of photopolymerizable singly and/or plurally unsaturated compounds with polymers. Suitable polymers include polyvinyl resins, for example polymers or copolymers or vinylidene chloride, vinyl esters of aliphatic monocarboxylic acids, vinylbenzene hydrocarbons such as styrene, or vinyl carboxylates, the vinyl group being in the acid function, for example homopolymers and copolymers of acrylic acids and derivatives thereof, and also unsaturated polyesters, alkyd resins or cellulose derivatives.

Particularly suitable polymers in photopolymerizable layers for the production of systems of optical information fixing, particularly for the production of relief printing plates, are linear synthetic polyamides of which copolyamides which are soluble in conventional solvents or solvent mixtures, such as in alcoholic solvents, for example mixtures of alcohol and water or in mixtures of benzene, alcohol and water, or in ketones or aromatic hydrocarbons are especially suitable. Suitable copolyamides of this type are polycondensation products of salts of the type of diamine and dicarboxylic acid which have been prepared from at least three polyamide-forming starting materials. Particularly suitable copolyamides for light-sensitive materials are those which have been prepared by cocondensation of a mixture of one or more than one lactam and at least one dicarboxylic acid/diamine salt, for example of ξ-caprolactam, hexamethylene diammonium adipate and p,p'-diaminodicyclohexylmethane adipate.

Photopolymerizable monomers which may be used with the said polymers and preferably together with the polyamides in light-sensitive layers for the production of relief plates are those which contain at least two polymerizable olefinic double bonds and which contain (in addition to the double bonds) amide groups, such as methylene-bis-acrylamide, methylene-bis-methacrylamide and also the bis-acrylamides or bis-methacrylamides of ethylenediamine, propylenediamine, butylenediamine, pentamethylenediamine, hexamethylene diamine, heptamethylenediamine, octamethylenediamine and polyamines and other diamines whose chains are branched or may be interrupted by heteroatoms or which contain cyclic systems. Monomers which contain urethane or urea groups, with or without amide groups, are very suitable. Naturally these monomers may be used mixed with monomers having only one photopolymerizable olefinic double bond.

The photoinitiators according to this invention have proved to be very suitable in the ultraciolet light curing of unsaturated polyester resins based on mixtures of conventional unsaturated polyesters with conventional olefinically unsaturated monomers. The unsaturated polyesters used for the purpose may be prepared by polycondensation of a mixture of unsaturated and saturated carboxylic acids, particularly dicarboxylic acids or their anhydrides, with polyhydric, preferably dihydric, alochols. The following literature may be referred to as regards the composition of unsaturated polyester resins, for example the book by H. V. Boenig, "Unsaturated Polyesters; Structure and Properties," Amsterdam, 1964. It may be mentioned that mixtures of polybutadiene homopolymers and/or copolymers with major proportions of unsaturated polyester resins can also be cured in the presence of the photoinitiators according to this invention. In the production of coatings from polyester resin materials containing α-methylolbenzoin ethers it is of particular advantage to add small amounts of skin-forming agents such as paraffin in the conventional manner. The coatings then rapidly form a wax layer on the surface during exposure to light or ultraviolet radiation so that hardened, solvent-resistant coatings are obtained within a very short time.

The composition of the polymerizable mixtures of monomers and polymers may be varied within a wide range. They generally contain 20 to 70 percent, preferably 30 to 60 percent, by weight of polymerizable monomers and 80 to 30 percent, preferably 70 to 40 percent, by weight of unsaturated or saturated polymers, depending on the intended application.

Conventional known polymerizable monomeric compounds having C—C plural bonds, alone or mixed with polymers, may be used as monomers for the photopolymerization. Vinyl compounds such as vinylaromatic compounds, for example styrene, alkylstyrenes, halostyrenes, divinylbenzenes or vinylnaphthalene are very suitable. Acrylic compounds, for example the esters, amides and nitriles of α,β-olefinically unsaturated monocarboxylic acids such as ethyl acrylate, n-butyl acrylate, t-butyl acrylate, methyl methacrylate, diacrylates and dimethyacrylates of aliphatic diols having two to eight carbon atoms, acrylonitrile, methacrylonitrile, acrylamide or methacrylamide are also often very suitable. Moreover vinyl esters of monocarboxylic and polycarboxylic acids such as vinyl acetate, vinyl propionate, vinyl acrylate or divinyl succinate, N-vinyllactams such as N-vinylpyrrolidone, and vinyl ethers of monohydroxy or polyhydroxy compounds, for example isobutyl vinyl ether or butanediol-1,4 divinyl ether, and also allyl compounds, for example allyl esters of monocarboxylic or polycarboxylic acids or inorganic acids such as diallyl phthalate, diallyl maleate, triallyl cyanurate or triallyl phosphate, and allyl ethers of monohydroxy or polyhydroxy compounds such as ethylene glycol diallyl ether or pentaerythritol tetraallyl ether, tetramethylol glyoxal diureine tetraallyl ether and soluble condensation products thereof may also be used. The monomers already specified are also suitable, particularly for the production of light-sensitive materials for the production of relief printing plates.

Conventional thermal inhibitors which are used in the production of light-sensitive compositions, for example hydroquinone, p-methoxyphenol, p-quinones, copper(I) chloride methylene blue, β-naphthylamine, β-naphthol, phenols and salts of N-nitrosocyclohexylhydroxylamine may also be used in the conventional manner in the light-sensitive materials in the conventional amounts.

The light-sensitive materials containing photoinitiators in accordance with this invention may be prepared from the components by conventional methods, for example by dissolving the components and removing the solvent followed by pressing, extrusion or rolling of the finely divided mixture. Sheeting or film may be cast from solutions of the components.

The light sources initiating the polymerization should advantageously have emission maxima in the range from 300 to 380 millimicrons or should have an adequate proportion of light of this wavelength. Medium pressure mercury vapor lamps are most suitable but high and low pressure lamps or superactinic fluorescent tubes may also be used.

The following Examples illustrate the invention. The parts and percentages specified in the following Examples are by weight unless otherwise stated. Parts bear the same relation to parts by volume as the kilogram to the liter.

EXAMPLE 1

106 parts of benzoin in 1,500 parts by volume of methanol is placed in a vessel and hydrogen chloride gas is passed in until the solution is saturated. The batch is allowed to stand overnight and then hydrochloric acid and methanol are distilled off in a weak vacuum at 60° C. Finally the residue remaining is heated in vacuo at about 12 mm to 100° C. A clear yellow brownish residue remains which is cooled to 50° C while stirring.

100 parts by volume of dimethylsulfoxide is added to the residue (pH 5 to 6) and at 30° C a suspension of 20 parts of paraformaldehyde in 150 parts by volume of dimethylsulfoxide and a solution of 1.2 parts of potassium hydroxide in 20 parts by volume of ethanol are added. The temperature rises to about 48° C and the pH TO 8 to 9. The batch is neutral after about an hour. The whole is stirred for another 20 hours at room temperature and the batch is then introduced into 600 parts by volume of water and rinsed with about 200 parts by volume of water. α-methylbenzoin methyl ether separates at the bottom. 200 parts by volume of methylene chloride is added while stirring. When the stirrer is stopped, two phases separate. The organic phase is separated and after having been shaken with water again is dried over dried sodium sulfate. The dry solution is concentrated in a weak vacuum; 102 parts of a yellowish oil which crystallizes slowly is obtained.

The recrystallized α-methylolbenzoin methyl ether crystals have a melting point of 72° to 73° C. Elementary analysis gives the following values:

| | | | |
|---|---|---|---|
| found: | C 75.2% | H 6.5% | O 18.8% |
| calculated: | 75.0% | 6.2% | 18.75%. |

The ultraviolet spectrum of α-methylolbenzoin methyl ether has one absorption maximum at 336 millimicrons.

EXAMPLE 2

1 part of α-methylolbenzoic methyl ether is added to a solution of 100 parts of a synthetic polyamide which is soluble in aqueous alcohols, 20 parts of m-xylylene bisacrylamide, 22 parts of the diether of one mole of ethylene glycol and 2 moles of N-methylolacrylamide, 8 parts of triethylene glycol bisacrylate and 0.1 part of the cyclohexylammonium salt of N-nitrosocyclohexylhydroxylamine. The solution is cast into film which is dried and pressed onto base plates at 120° C.

Specimens of finished plates are exposed to light for certain different periods in contact with a negative.

Fluorescent tubes having a high proportion of ultraviolet light, which are situated at a distance of 3 cm from the plate to be exposed are used as the light source. After exposure, the unexposed portions of the plate are dissolved out with a mixture of alcohol and water. Evaluation of the plates shows that they have a lower exposure time of three minutes.

COMPARATIVE EXPERIMENTS 1 to 3

The procedure described in Example 2 is exactly followed but benzoin methyl ether (Experiment 1), α-phenylbenzoin (Experiment 2) AND 1,1-diphenyl-1-methoxyacetophenone (Experiment 3) are used instead of α-methylolbenzoin methyl ether. Evaluation of the exposure tests showed that plates in comparative experiment 1 have a lower exposure time of 12 minutes, in comparative experiment 2 of 16 minutes and in comparative experiment 3 of 8 minutes, i.e. a clearly longer exposure time is required.

EXAMPLE 3

35 parts of styrene and 3 parts of α-methylolbenzoin methyl ether are added to 65 parts of an unsaturated polyester which has been prepared by a conventional method from 2 parts of maleic acid, 1 part of phthalic acid and 3 parts of propylene glycol. One half of the mixture is poured out to form a thin film (thickness 500 microns) on a steel sheet and exposed to light for 5 minutes as described in Example 2. The cured coating has a pendulum hardness of 130.

The second half of the reactive mixture containing photoinitiator is kept at 65° C and the stability of the mixture in storage is determined. It is more than 20 hours.

COMPARATIVE EXPERIMENTS 4 AND 5

The procedure of Example 3 is followed exactly but benzoin isopropyl ether (Comparative Experiment 4) or benzoin methyl ether (Comparative Experiment 5) is used in an equal amount instead of α-methylolbenzoin methyl ether. The results are as follows:

| | Storage stability at 65° C | Pendulum hardness |
|---|---|---|
| Comparative Experiment 4 | 9 hours | 111 |
| Comparative Experiment 5 | 2 hours | 115 |

EXAMPLE 4

1,300 parts of a copolyamide from about equal amounts of caprolactam, hexamethylene diamine adipate and bis-(4-aminocyclohexyl)-methane adipate, 4 parts of the cyclohexylammonium salt of N-nitrosocyclohexylhydroxylamine, 14 parts of α-methylolbenzoin methyl ether and 160 parts of ethylene glycol are dissolved at 60° C in 160 parts of water and 3,000 parts of a 20 percent solution in methanol of the diether from one mole of ethylene glycol and 2 moles of N-methylolacrylamide. The solution is concentrated to a solids content of about 50 percent and poured onto thin sheet steel. The layers are dried (thickness of layers 500 microns). The various samples are exposed to light for different periods as described in Example 2 and after exposure the unexposed portions of the layers are dissolved away with a mixture of alcohol and water. Evaluation of the samples gave a lower exposure time of 1 to 2 minutes.

COMPARATIVE EXPERIMENT 6

The procedure of Example 4 is followed but benzoin isopropyl ether is used instead of α-methylolbenzoin methyl ether. The lower exposure time is 5 to 6 minutes.

EXAMPLE 5 AND COMPARATIVE EXPERIMENT 7

In each case 100 parts of a saturated polyester resin consisting of 65 parts of a commercially available polyester from 2 parts of maleic acid, 1 part of phthalic acid and 3 parts of propylene glycol and 35 parts of styrene has added to it the photoinitiators listed in the following Table in the amounts therein specified. Portions of the mixture are stored at 60° C to determine the storage stability, and portions of the mixtures are applied in a thickness of 500 microns to sheet steel and exposed to fluorescent tubes having a high ultraviolet fraction. The period of exposure and the pendulum and hardness of the coatings cured and stored for different times are given in the following Table. It will be seen that the resins to which α-methylolbenzoin methyl ether has been added show a clearly better storage stability at 60° C than resins to which benzoin isopropyl ether has been added.

TABLE

| photo-initiator | Example 5 α-methylolbenzoin methyl ether | | | | Comparative Experiment 7 benzoin isopropyl ether | |
|---|---|---|---|---|---|---|
| amount % | 2 | 2 | 3 | 3 | 3 | 3 |
| storage stability | 200 hours | | 200 hours | | 120 hours | |
| exposure time (mins) | 3 | 5 | 3 | 5 | 3 | 5 |
| pendulum hardness of coatings after: | | | | | | |
| 1 hour | 110 | 113 | 110 | 116 | 115 | 130 |
| 18 days | 177 | 181 | 182 | 185 | 169 | 172 |
| 30 days | 179 | 178 | 179 | 180 | 180 | 179 |

We claim:
1. An α-methylolbenzoin ether having the formula:

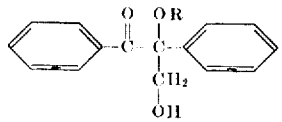

where R denotes an alkyl radical having one to eight carbon atoms or an alkoxyalkyl radical having one to eight carbon atoms.

2. An α-methylolbenzoin ether having the formula given in claim 1 in which R denotes an alkyl radical having one to four carbon atoms or an alkoxyalkyl radical having one to four carbon atoms.

3. An α-methylolbenzoin ether having the formula given in claim 1 in which R denotes methyl.

* * * * *

PO-1050
(5/69)

UNITED STATES PATENT OFFICE
CERTIFICATE OF CORRECTION

Patent No. 3,689,565      Dated September 5, 1972

Inventor(s) Hoffmann et al

It is certified that error appears in the above-identified patent and that said Letters Patent are hereby corrected as shown below:

Cover page, left hand column, insert -- [73] ASSIGNEE: Badische Anilin-& Soda Fabrik Aktiengesellschaft, Ludwigshafen am Rhein, Germany --

Cover page, left hand column, insert -- [30] Foriegn Application Priority Data
May 7, 1969......... Germany P 19 23 266.7 --

Signed and sealed this 19th day of November 1974.

(SEAL)
Attest:

McCOY M. GIBSON JR.
Attesting Officer

C. MARSHALL DANN
Commissioner of Patents